(No Model.)

W. MASON.
DRILL CHUCK.

No. 323,181. Patented July 28, 1885.

Wm. Mason,
Inventor,

By Atty.

Witnesses,
Fred C. Earle

UNITED STATES PATENT OFFICE.

WILLIAM MASON, OF NEW HAVEN, CONNECTICUT.

DRILL-CHUCK.

SPECIFICATION forming part of Letters Patent No. 323,181, dated July 28, 1885.

Application filed June 15, 1885. (No model.)

*To all whom it may concern:*

Be it known that I, WM. MASON, of New Haven, in the county of New Haven and State of Connecticut, have invented a new Improvement in Drill-Chucks; and I do hereby declare the following, when taken in connection with accompanying drawings and the letters of reference marked thereon, to be a full, clear, and exact description of the same, and which said drawings constitute part of this specification, and represent, in—

Figure 1:
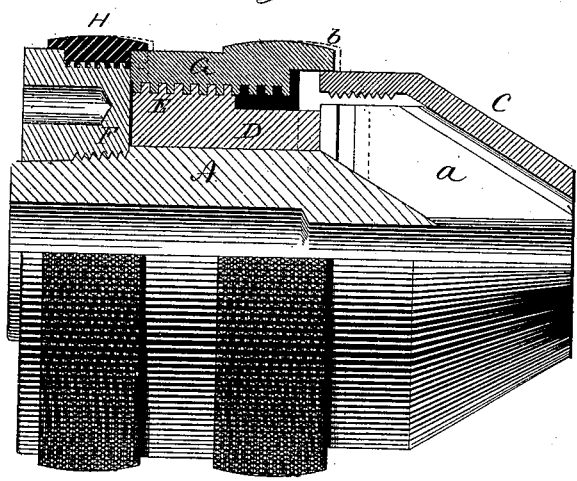
Figure 2:
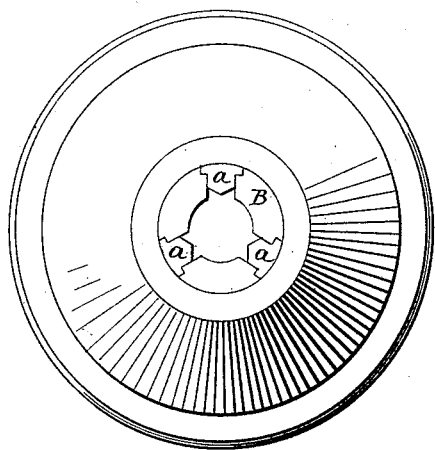
Figure 3:
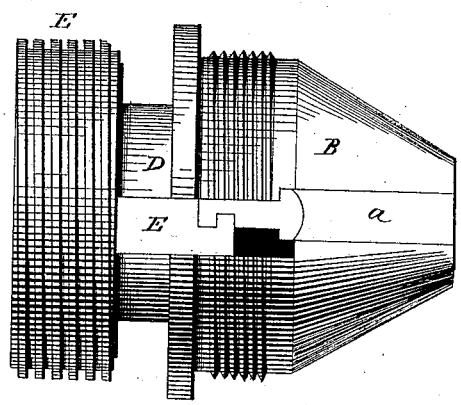

Figure 1, a side view in partial longitudinal section; Fig. 2, a front end view; Fig. 3, a side view of the head and the screw-threaded sleeve, showing the connection between the said sleeve and the jaws.

This invention relates to an improvement in that class of chucks designed to be fixed to the mandrel of a lathe to hold tools or articles to be revolved, and particularly to that class of chucks which consist of a conical-shaped head having radial recesses therein, with jaws arranged in said recesses and guided thereby, so that under longitudinal movement of the jaws they will at the same time receive a radial movement to grasp or release the tool, according to the direction of the movement of the jaws. These jaws are usually moved by a screw-thread in some part of the chuck, so that by holding one part and revolving the other the screw-thread will impart a longitudinal movement to the jaws, according to the direction in which the screw is turned. The screw is usually of considerable pitch, in order that the movement of the jaws or their adjustment may be quickly made; but while such a screw enables the quick movement of the jaws the power of the grasp of the jaws is less than it would be were the pitch of the screw less and the movement of the jaws slower.

The object of my invention is to provide differential screws for the operation of the jaws, the quicker thread being used to give to the jaws their longitudinal and consequently radial movement and their initial grasp upon the article to be held by the chuck, and the slower thread to give to them a firm grasp upon the article.

In two inventions of my own, for which I have filed application for Letters Patent, Serial No. 152,583, filed January 12, 1885, and No. 162,781, filed April 20, 1885, I have shown a device for accomplishing this object. My present invention is a modification of the said previous inventions, or, rather, a different adaptation of the differential screws; and the invention consists in the construction of the chuck, whereby the differential screws are made to operate upon the jaws, as more fully hereinafter described, and particularly recited in the claim.

A represents the body of the chuck, which is adapted to be attached to the mandrel in the usual manner. At its outer end it carries a conical-shaped head, B, in which longitudinal grooves are made to receive the jaws (here represented as three) *a a a*. The jaws are arranged in the head in the usual manner, and so as to be guided thereby, and upon the head an inclosing cap or shell, C, is applied, screwed to the head which covers the jaws, as seen in Fig. 1, and in the usual manner, and so that as the jaws are forced longitudinally outward the inclination or contraction of the shell will force the jaws radially inward, and on the return or inward movement of the jaws they will be correspondingly moved outward in a radial direction, and in the usual manner for this class of chucks.

Upon the body A a sleeve, D, is arranged to slide longitudinally, and it is provided with arms E, each adapted to engage the respective jaws, as seen in Fig. 3, and so that a longitudinal movement of the sleeve D will correspondingly move the jaws, there being longitudinal openings in the head, as seen in Fig. 3, in which arms E, in giving such longitudinal movement, and such openings engaging the arms, prevent the rotation of the sleeve D upon the body A. The rear portion, E, of the sleeve D is screw-threaded upon its periphery, as seen in Figs. 1 and 3.

At the rear of the sleeve a collar, F, is screwed onto the body, and so as to leave a space between the collar and the rear end of the head, within which the sleeve D may move for the longitudinal movement necessary in the operation of the jaws. Into this same annular space, between the collar F and the head, an annular ring, G, is arranged, internally screw-threaded, corresponding to the screw-threaded portion of the sleeve D. The ring G is somewhat shorter than the length of the space between the collar F and the end of the head, and so that a certain extent of longitudinal movement may be given to the ring G; but to close the space between the ring and the head, which would be open, owing to such arrangement, for the necessary longitudinal movement, I extend the ring into the flange-like shape b forward, and so as to overlap the rear or inner end of the cap C, as seen in Fig. 1. The rear end of the ring G is adapted to abut against the collar F, and so that by rotating the ring G a corresponding longitudinal movement will be imparted to the sleeve D, and thence to the jaws—that is to say, turning the ring in one direction the jaws will be forced outward; in the opposite direction will be correspondingly forced inward. This operation of the ring G, aside from its permissible longitudinal movement, is substantially the same as in known chucks.

The exterior of the collar F is screw-threaded, but with a considerably less pitch than the pitch of the thread between the principal ring G and the sleeve D, as seen in Fig. 1, and upon this screw-threaded portion of the collar F a second auxiliary ring, H, is arranged, internally screw-threaded, corresponding to the external screw-thread of the collar F, the said ring H being constructed to work against the rear end of the ring G. This completes the construction.

In operation, when it is desired to move the jaws so as to grasp an article placed therein, the ring G is turned accordingly, and, because of its quick thread, moves the sleeve D and the jaws with considerable rapidity, so that the jaws are moved longitudinally outward and radially inward until they come to a bearing upon the article—say as indicated in broken lines, Fig. 1. When the jaws have arrived to this bearing-point, the operator then rotates the ring H, which works against the rear end of the ring G, and forces it forward under the slow movement of the thread of the ring H, the ring G carrying with it the slide D and the jaws, as indicated in broken lines, Fig. 1, thereby, under such slow advancing movement of the jaws, giving them a firmer grasp upon the article.

In relieving the jaws from their grasp the ring H is first unscrewed to relieve the ring G. Then the ring G, returned, will quickly open the jaws. By this construction the thread between the ring G and the sleeve D may be of very much greater pitch than would be practical were it not for the differential ring H, and the ring H may be of a pitch very much less than would be practical where a single thread only is used for the movement of the jaws, thus enabling the adjustment of the jaws to be more quickly made than can be under the ordinary construction, and also permitting a very much stronger grasp to be made by the jaws than can be by such ordinary construction.

As illustrated, the collar F forms the abutment against which the principal ring G bears, but the auxiliary ring H may itself form the abutment, as shown, against which the principal ring G will work in the forward movement of the jaws.

From the foregoing it will be understood that I do not in this application claim, broadly, a chuck having differential screws, whereby the movement and grasp of the jaws may be produced.

I have represented and described the connections between the principal screw-threaded ring and the jaws as by a sleeve-like slide on the body of the chuck, from which arms extend into connection with the jaws. In some constructions of this class of chuck the arms which connect the jaws with the screw-threaded ring are each independent of the other, but each provided with a screw-thread corresponding to the internal screw-thread of the ring. Therefore, while I prefer to connect the several arms and make them as a part of a sliding sleeve, they may be constructed independent of each other, and by the term "sleeve on the body in connection with the jaws," I wish to be understood as embracing any of the known connections between the jaws and the jaw-actuating sleeve.

What I claim is—

In a drill-chuck, the combination of a conical-shaped head, jaws arranged therein, free for longitudinal and radial movement, the head constructed with a body extending therefrom and adapted for attachment to the mandrel, a sleeve on said body, free for longitudinal movement and connected to said jaws, the exterior of the said sleeve screw-threaded, a principal ring surrounding said sleeve, internally screw-threaded, corresponding to the screw-thread on said sleeve, an abutment in rear of said sleeve and against which said ring may bear, the said ring also free for a certain extent of longitudinal movement with the sleeve, and a second internally-screw-threaded ring, the screw-thread of which is of smaller pitch than that of the principal ring, arranged upon a corresponding screw-threaded portion of the chuck in rear of said principal ring and adapted to force said principal ring forward, substantially as described.

WILLIAM MASON.

Witnesses:
 JOHN E. EARLE,
 FRED C. EARLE.